UNITED STATES PATENT OFFICE.

JOHN HARRINGTON, OF RYDE, ISLE OF WIGHT, ENGLAND, ASSIGNOR, BY MESNE ASSIGNMENTS, TO THE SHAWMUT MANUFACTURING COMPANY, OF HARTFORD, CONNECTICUT.

IMPROVEMENT IN THE MANUFACTURE OF ARTIFICIAL LEATHER.

Specification forming part of Letters Patent No. 168,485, dated October 5, 1875; Reissue No. 7,553, dated November 13, 1877; application filed September 17, 1877.

*To all whom it may concern:*

Be it known that I, JOHN HARRINGTON, of Ryde, Isle of Wight, England, gentleman, have invented certain Improvements in the Production of Artificial Leather, of which the following is a specification:

In carrying out my invention, I make a cast or impression in shellac from a skin of morocco or other description of leather which it is desired to imitate or reproduce in fac-simile. To make this cast or impression, a strong metal or other plate is covered with shellac, and when the shellac is yet soft, after having been melted, the leather to be copied is placed in contact therewith and pressed firmly upon the shellac, and when the shellac is sufficiently cool the skin is removed, leaving the mold ready for use.

The strong or long-fibered paper used for the manufacture of this artificial leather being stained or colored to any desired color, according to the desired ground-color, is colored upon its surface to correspond with the tint required for the artificial leather to be produced.

The next preparation applied to the paper is a waterproofing preparation, which is applied by brushing over its surface, by preference, a weak solution of shellac, either in methylated spirit or in water, as is well understood. The strength of the shellac solution which I prefer to use is about one pound of shellac to a gallon of spirit or water. Other descriptions of varnish may, however, be applied for this purpose.

Glycerine applied to the paper will add greatly to its pliability, as is well known. In cases where the paper is dyed by immersion, mix the glycerine with the dye or stain in the proportion of about ten fluid ounces of glycerine to a gallon of the dye or solution; where the paper is dyed or stained otherwise than by immersion, work the glycerine into the paper by brushing or otherwise applying the glycerine thereto, or immerse the paper in a solution of glycerine and water, in the proportion of about two parts glycerine to one part water. Passing the paper between polished metal plates or rolls will glaze and make it very smooth.

The paper having been colored to the tint required, and varnished, is, when dry, placed on the mold and forced against its face, preferably by the aid of flat hydraulic pressure, so that when removed from the mold the paper will present upon its face a fac-simile of the mold, which is also a fac-simile of the face of the leather from which it was taken. India-rubber cloth or other yielding material is interposed between the pressing-surface and the paper on the mold.

If desired, more than one thickness of paper may be used in the preparation of the imitation leather, in which case I proceed either as above described or as follows: I take a sheet of paper of the color required and lay it upon the mold, and press it so as to force the paper into the mold. A second sheet of paper, with gum, dextrine, starch, paste, or other suitable cement applied to its surface, is put down upon the former embossed sheet, and it also is passed under pressure and so on, according to the thickness required, whether two, three, four, or more sheets are necessary. This being decided, the whole combination is lifted from the mold and dried, when it may be colored upon its surface with any suitable oil or water color, after which it may be rendered water-proof by brushing over each surface thereof the before-mentioned solution of shellac or other varnish; or it may be bronzed or gilt. When dry, if it is a fac-simile of hard-grained morocco, the tips or top of the grain may be burnished, polished, or varnished, which will render the imitation perfect.

I am aware that molds for various purposes have been made of glue and india-rubber, and of compounds of shellac with tar and sand, and of shellac with plumbago, asphaltum, and gutta-percha.

A mold made of shellac, as herein described, will be very hard, will permit the formation in it by a skin, and the reproduction from it on paper of the peculiar grain or varied face of the leather against which the mold was hardened in its formation, and will not crush or yield under pressure as applied to produce artificial leather.

I do not broadly claim the use of glycerine to render the paper more pliable, as that property of glycerine has long been known and applied to paper.

I may use paper in long lengths or in the roll to produce imitation leather of any desired length. In such case I cause each impression of the mold to overlap, to a slight extent, that previously produced on the paper, the lines of junction of the successive impressions being imperceptible, or nearly so.

Having thus described the nature of my invention, I claim—

1. A mold made of shellac, as and for the purpose described.

2. In the manufacture of artificial leather from paper, the process herein described of coloring the surface of the paper to the desired tint, varnishing or waterproofing it, and embossing it on a mold formed in fac-simile of leather, substantially as described.

3. In the manufacture of artificial leather from dyed or colored and varnished paper, the herein-described process of producing a surface in fac-simile of leather, consisting in pressing such prepared paper upon a fac-simile mold cast from the surface of the skin, to be reproduced in fac-simile in paper, substantially as described.

4. In the art of manufacturing artificial leather from paper having its body of the color desired for the ground, the described process of coloring the surface to the desired tint, applying glycerine to render the paper pliable, waterproofing or varnishing the paper, and embossing it on a mold made, as described, in fac-simile of leather, substantially as described.

In testimony whereof I have signed my name to this specification in the presence of two subscribing witnesses.

JOHN HARRINGTON.

Witnesses:
G. W. GREGORY,
W. J. PRATT.